United States Patent
Sun et al.

(10) Patent No.: US 10,687,362 B2
(45) Date of Patent: Jun. 16, 2020

(54) SLOT FORMAT INDICATOR ENHANCEMENTS FOR NEW RADIO-UNLICENSED

(71) Applicant: QUALCOMM Incorporated, San Diego, CA (US)

(72) Inventors: Jing Sun, San Diego, CA (US); Xiaoxia Zhang, San Diego, CA (US); Ozcan Ozturk, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/676,308

(22) Filed: Nov. 6, 2019

(65) Prior Publication Data

US 2020/0154477 A1 May 14, 2020

Related U.S. Application Data

(60) Provisional application No. 62/758,766, filed on Nov. 12, 2018.

(51) Int. Cl.
| | |
|---|---|
| *H04W 74/08* | (2009.01) |
| *H04W 28/06* | (2009.01) |
| *H04W 72/04* | (2009.01) |
| *H04W 72/12* | (2009.01) |
| *H04W 74/00* | (2009.01) |
| *H04W 76/27* | (2018.01) |

(52) U.S. Cl.
CPC ....... *H04W 74/0816* (2013.01); *H04W 28/06* (2013.01); *H04W 72/0446* (2013.01); *H04W 72/1268* (2013.01); *H04W 74/006* (2013.01); *H04W 76/27* (2018.02)

(58) Field of Classification Search
CPC .................................................. H04W 74/0816
USPC ........................................................ 370/329
See application file for complete search history.

(56) References Cited

U.S. PATENT DOCUMENTS

| | | | |
|---|---|---|---|
| 2019/0082426 A1* | 3/2019 | Liou | H04B 7/02 |
| 2019/0215781 A1* | 7/2019 | Jeon | H04W 24/10 |

(Continued)

OTHER PUBLICATIONS

Huawei, et al., "NR Numerology and Frame Structure for Unlicensed Bands", 3GPP Draft, 3GPP TSG RAN WG 1 Meeting #95, R1-1812191, 3rd Generation Partnership Project (3GPP), Mobile, Competence Centre, 658, Route Des Lucioles, F-06921, Sophia-Anti Polis Cedex, France, vol. RAN WG1, No. Spokane, USA, Nov. 12, 2018-Nov. 16, 2018, Nov. 11, 2018 (Nov. 11, 2018), XP051554063, 13 pages, Retrieved from the Internet: URL: http://www.3gpp.org/ftp/Meetings%F3GPP%5FSYNC/RAN1/Docs/R1%2D1812191%2Ezip. [retrieved on Nov. 11, 2018], section 4.

(Continued)

*Primary Examiner* — Peter G Solinsky
(74) *Attorney, Agent, or Firm* — Liem T. Do

(57) ABSTRACT

Enhancements to slot format indicator (SFI) for new radio (NR) unlicensed (NR-U) operations is disclosed. The SFI may be transmitted separately from a channel occupancy time (COT) range indication. The COT range indication identifies parameters of a three-segment structure of a current COT within the current TxOP. Upon receiving the SFI and COT range indication, a UE may engage in communications with the serving UE in accordance with the COT range indication and the SFI.

30 Claims, 13 Drawing Sheets

(56) References Cited

U.S. PATENT DOCUMENTS

| | | | |
|---|---|---|---|
| 2019/0313383 A1* | 10/2019 | Xiong | H04W 72/042 |
| 2020/0021999 A1* | 1/2020 | Park | H04W 76/11 |
| 2020/0029340 A1* | 1/2020 | He | H04W 4/40 |

OTHER PUBLICATIONS

Intel Corporation: "On the NR-Unlicensed Frame Structure", 3GPP Draft, 3GPP TSG RAN WG1 Meeting #95, R1-1812479, Intel NR-U Frame, Structure, 3rd Generation Partnership Project (3GPP), Mobile, Competence Centre, 658, Route Des Lucioles, F-06921, Sophia-Anti Polis Cedex, France, vol. RAN WG1, No. Spokane, USA, Nov. 12, 2018-Nov. 16, 2018, Nov. 11, 2018 (Nov. 11, 2018), XP051554423, 7 pages, Retrieved from the Internet: URL: http://www.3gpp.org/ftp/Meetings%5F3GPP%5FSYNC/RAN1/Docs/R1%2D1812479%2Ezip. [retrieved on Nov. 11, 2018-], section 3.

Interdigital Inc: "On NR-U Frame Structure", 3GPP Draft, 3GPP TSG RAN WG1 Meeting #94, R1-1809086, on NR-U Frame Structure, 3rd Generation Partnership Project (3GPP), Mobile, Competence Centre, 650, Route Des Lucioles, F-06921, Sophia-Anti Polis Cedex, France, vol. RAN WG1, No. Gothenburg, Sweden, Aug. 20, 2018-Aug. 24, 2018, Aug. 11, 2018 (Aug. 11, 2018), XP851516455, 5 pages, Retrieved from the Internet: URL: http://www.3gpp.org/ftp/tsg%5Fran/WG1%5FRL1/TSGR1%5F94/Docs/R1%2D1809086%Ezip. [retrieved on Aug. 11, 2018] section 5.

International Search Report and Written Opinion—PCT/US2019/060245—ISA/EPO—dated Mar. 20, 2020.

Nokia, et al., "Remaining Issues on Channel Access for LAA UL", 3GPP Draft, 3GPP TSG RAN WG1 Meeting #86, R1-167626, Channel Access for LAA UL—Final, 3rd Generation Partnership Project (3GPP), Mobile, Competence Centre, 650, Route Des Lucioles, F-06921, Sophia-Anti Polis Cedex, France, vol. RAN WG1, No. Gothenburg, Sweden, Aug. 22, 2016-Aug. 26, 2016, Aug. 21, 2016 (Aug. 21, 2016), XP051140763, 5 pages, Retrieved from the Internet: URL: http://www.3gpp.org/ftp/Meetings_3GPP_Sync/RAN1/Docs/. [retrieved on Aug. 21, 2016], section 2.

Samsung: "Frame Structure for NR-U", 3GPP Draft, R1-1812974, 3GPP TSG RAN WG1 Meeting #94bis, Frame Structure, 3rd Generation Partnership Project (3GPP), Mobile, Competence Centre, 658, Route Des Lucioles, F-06921, Sophia-Anti Polis Cedex, France, vol. RAN WG1, No. Spokane, USA, Nov. 12, 2018-Nov. 16, 2018, Nov. 11, 2018 (Nov. 11, 2018), XP851554953, 7 pages, Retrieved from the Internet: URL: http://www.3gpp.org/ftp/Meetings%5F3GPP%5FSYNC/RAN1/Docs/R1%2D1812974%2Ezip. [retrieved on Nov. 11, 2018], section 7.

Sony: "Considerations on Channel Access for NR Unlicensed Operations", 3GPP Draft, 3GPP TSG RAN WG1 Meeting #95, R1-1812738, 3rd Generation Partnership Project (3GPP), Mobile, Competence Centre, 650, Route Des Lucioles, F-06921, Sophia-Anti Polis Cedex, France, vol. RAN WG1, No. Spokane, USA, Nov. 12, 2018-Nov. 16, 2018, Nov. 11, 2018 (Nov. 11, 2018), XP051554696, 6 pages, Retrieved from the Internet: URL: http://www.3gpp.org/ftp/Meetings%5F3GPP%5FSYNC/RAN1/Docs/R1%2D1812738%2Ezip. [retrieved on Nov. 11, 2018], section 2.1.

* cited by examiner

SLOT FORMAT INDICATOR ENHANCEMENTS FOR NEW RADIO-UNLICENSED

CROSS-REFERENCE TO RELATED APPLICATIONS

This application claims the benefit of U.S. Provisional Patent Application No. 62/758,766, entitled, "SFI ENHANCEMENTS FOR NR-U," filed on Nov. 12, 2018, which is expressly incorporated by reference herein in its entirety.

BACKGROUND

Field

Aspects of the present disclosure relate generally to wireless communication systems, and more particularly, to slot format indicator (SFI) enhancements for new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a user equipment (UE), a slot format indicator (SFI) from a serving base station, wherein the SFI identifies a symbol status of each symbol of a plurality of slots within a current transmission opportunity (TxOP), receiving, at the UE, a channel occupancy time (COT) range indication for a current COT of one or more COTs of the current TxOP, wherein the COT range indication identifies parameters of a three-segment structure of the current COT including a first COT segment, a second COT segment, and a third COT segment, and engaging, by the UE, in communication with the serving base station in at least the first COT segment in accordance with the COT range indication and the SFI.

In an additional aspect of the disclosure, a method of wireless communication includes detecting, by a base station, a COT range indication of a neighboring base station, wherein the COT range indication identifies at least a segment level state indicator of a three-segment structure of a current COT of one or more COTs of the current TxOP of the neighboring base station, and scheduling, by the base station, transmissions with one or more served UEs based in part on the segment level state indicator for the neighboring base station.

In an additional aspect of the disclosure, an apparatus configured for wireless communication includes means for receiving, at a UE, a SFI from a serving base station, wherein the SFI identifies a symbol status of each symbol of a plurality of slots within a current TxOP, means for receiving, at the UE, a COT range indication for a current COT of one or more COTs of the current TxOP, wherein the COT range indication identifies parameters of a three-segment structure of the current COT including a first COT segment, a second COT segment, and a third COT segment, and means for engaging, by the UE, in communication with the serving base station in at least the first COT segment in accordance with the COT range indication and the SFI.

In an additional aspect of the disclosure, an apparatus configured for wireless communication includes means for detecting, by a base station, a COT range indication of a neighboring base station, wherein the COT range indication identifies at least a segment level state indicator of a three-segment structure of a current COT of one or more COTs of the current TxOP of the neighboring base station, and means for scheduling, by the base station, transmissions with one or more served UEs based in part on the segment level state indicator for the neighboring base station.

In an additional aspect of the disclosure, a non-transitory computer-readable medium having program code recorded thereon. The program code further includes code to receive, at a UE, a SFI from a serving base station, wherein the SFI identifies a symbol status of each symbol of a plurality of slots within a current TxOP, code to receive, at the UE, a COT range indication for a current COT of one or more COTs of the current TxOP, wherein the COT range indication identifies parameters of a three-segment structure of the current COT including a first COT segment, a second COT segment, and a third COT segment, and code to engage, by the UE, in communication with the serving base station in at least the first COT segment in accordance with the COT range indication and the SFI.

In an additional aspect of the disclosure, a non-transitory computer-readable medium having program code recorded thereon. The program code further includes code to detect, by a base station, a COT range indication of a neighboring base station, wherein the COT range indication identifies at least a segment level state indicator of a three-segment structure of a current COT of one or more COTs of the current TxOP of the neighboring base station, and code to schedule, by the base station, transmissions with one or more served UEs based in part on the segment level state indicator for the neighboring base station.

In an additional aspect of the disclosure, an apparatus configured for wireless communication is disclosed. The apparatus includes at least one processor, and a memory coupled to the processor. The processor is configured to receive, at a UE, a SFI from a serving base station, wherein the SFI identifies a symbol status of each symbol of a plurality of slots within a current TxOP, to receive, at the UE, a COT range indication for a current COT of one or more COTs of the current TxOP, wherein the COT range indication identifies parameters of a three-segment structure of the current COT including a first COT segment, a second COT segment, and a third COT segment, and to engage, by the UE, in communication with the serving base station in at least the first COT segment in accordance with the COT range indication and the SFI.

In an additional aspect of the disclosure, an apparatus configured for wireless communication is disclosed. The apparatus includes at least one processor, and a memory coupled to the processor. The processor is configured to detect, by a base station, a COT range indication of a neighboring base station, wherein the COT range indication identifies at least a segment level state indicator of a three-segment structure of a current COT of one or more COTs of the current TxOP of the neighboring base station, and to schedule, by the base station, transmissions with one or more served UEs based in part on the segment level state indicator for the neighboring base station.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
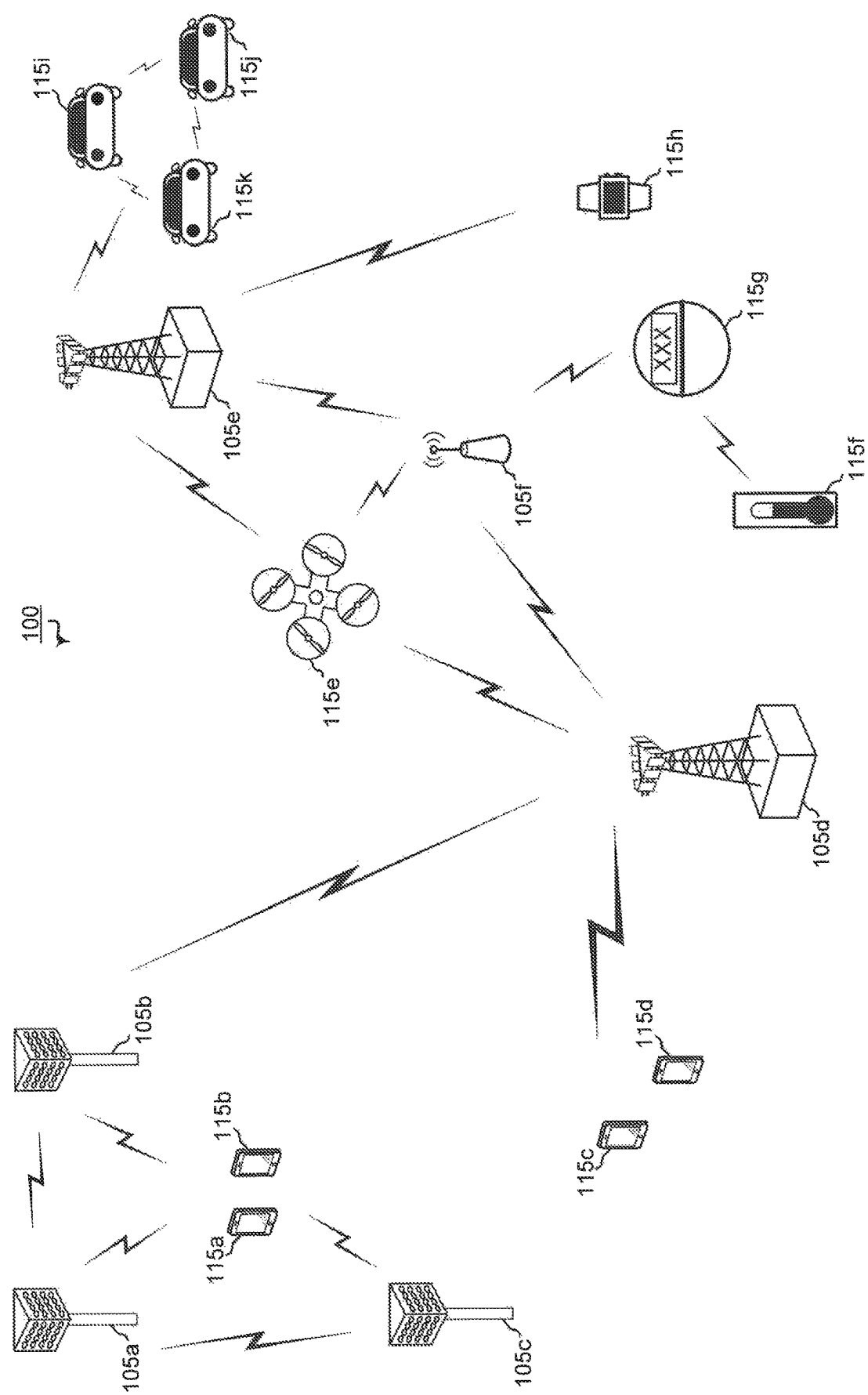
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
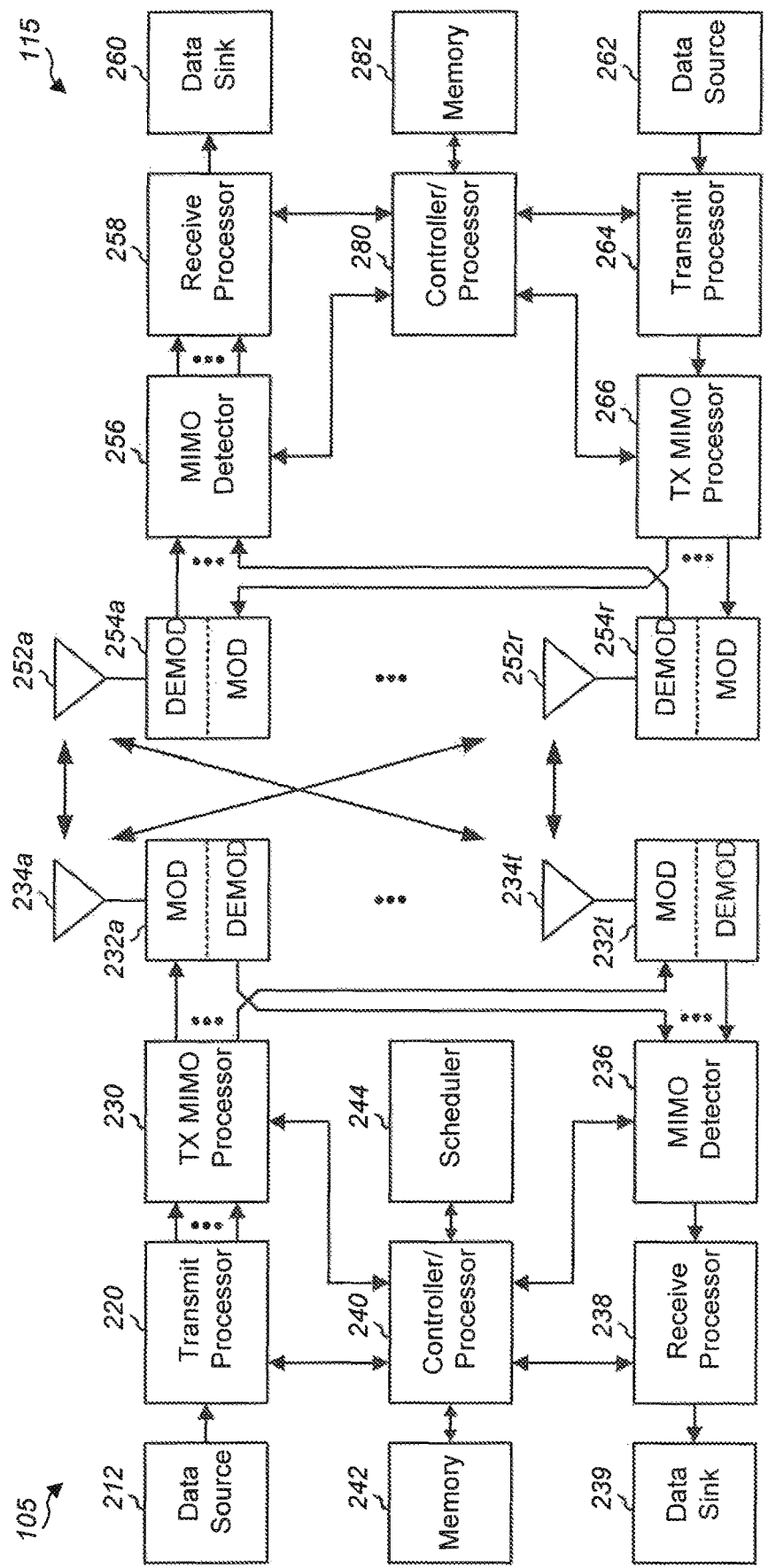
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
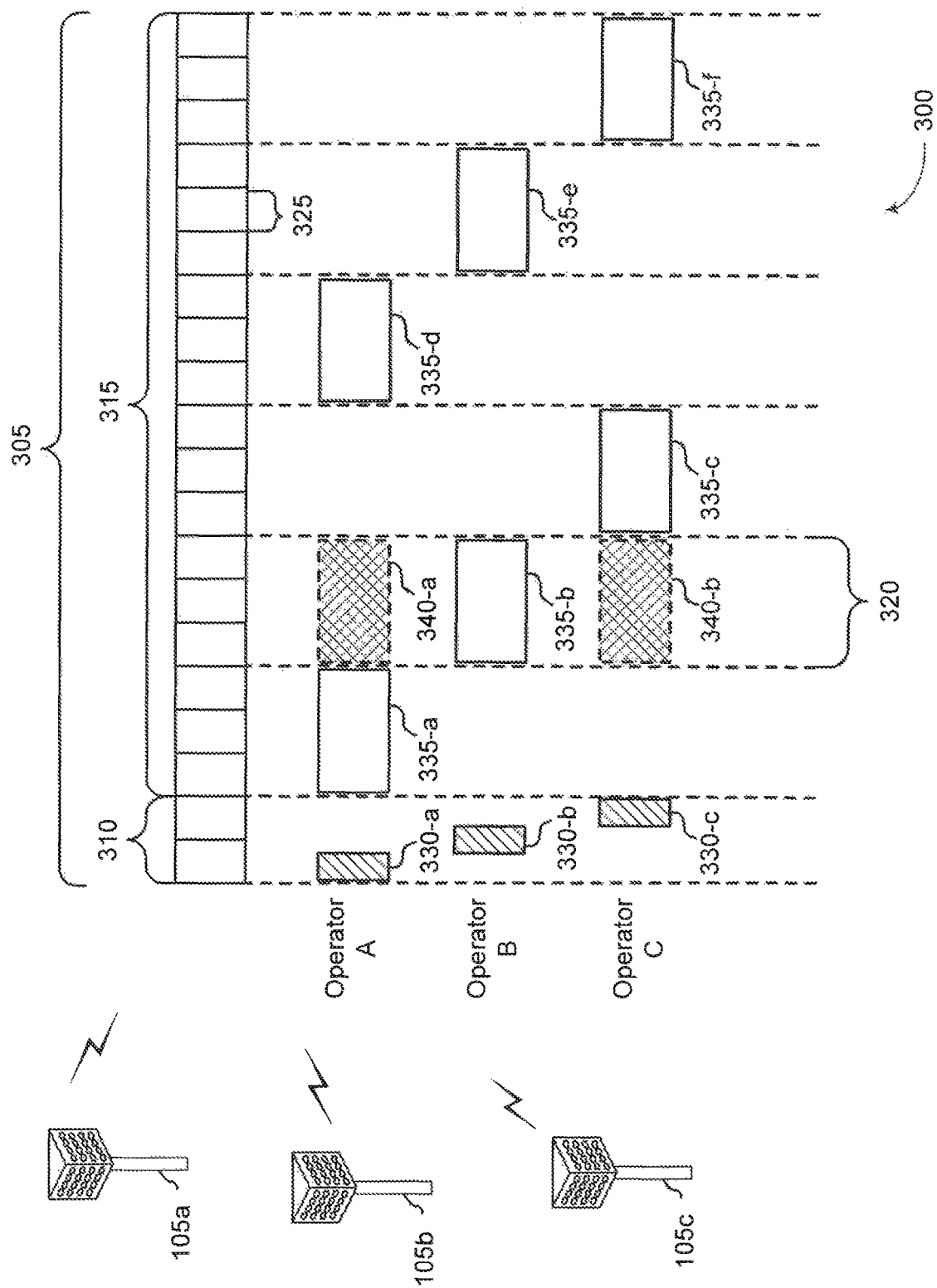
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c may be prioritized for Operator C (e.g., G-INT-OpC), resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-ρs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

As new radio (NR) functionality was developed, the concept of a slot format indicator (SFI) was introduced. The main functionality of the SFI is to update any radio resource control (RRC) configured flexible symbols for either downlink reception or uplink transmission. If the SFI indicates a different direction than the configured RRC operation or a flexible symbol, the RRC configuration operation will cancel. For example, if the RRC configured CSI-RS on some symbols indicated as flexible by the TDD configuration, and the SFI indicates otherwise, the SFI would take precedence. However, where SFI monitoring is configured, if the UE fails to detect an expected SFI, the UE will cancel any RRC configured behavior other than PDCCH monitoring. This default process, of canceling the RRC configured behavior on the failure to detect the SFI, provides a conservative process in case the base station had sent the SFI to cancel the RRC configuration, but the UE failed to decode.

The SFI identifies the detailed symbol status (e.g., downlink, uplink, flexible) of each symbol for a set of slots. In NR-U operations, the channel occupancy time (COT) structure should also be provided. However, if the indication of COT structure were purely dependent on the UE-specific SFI table configuration, the number of additional fields or entries that would be needed to specify the various different COT structures would greatly increase the overhead of the UE specific table. One solution that has been suggested is to separate the COT length indication from the state indication. A COT may also have a pause, which would be considered outside of the TxOP, that should be identified as well. There are current suggested solutions that would introduce another state for a pause, in addition to downlink, uplink, and flexible. However, again the addition of another state would simply continue to exponentially increase any resulting UE specific table length considering the number of possible combinations. Various aspects of the present disclosure are directed to indicating a COT range separately from the SFI by identifying a three-segment structure.

Figure 4:
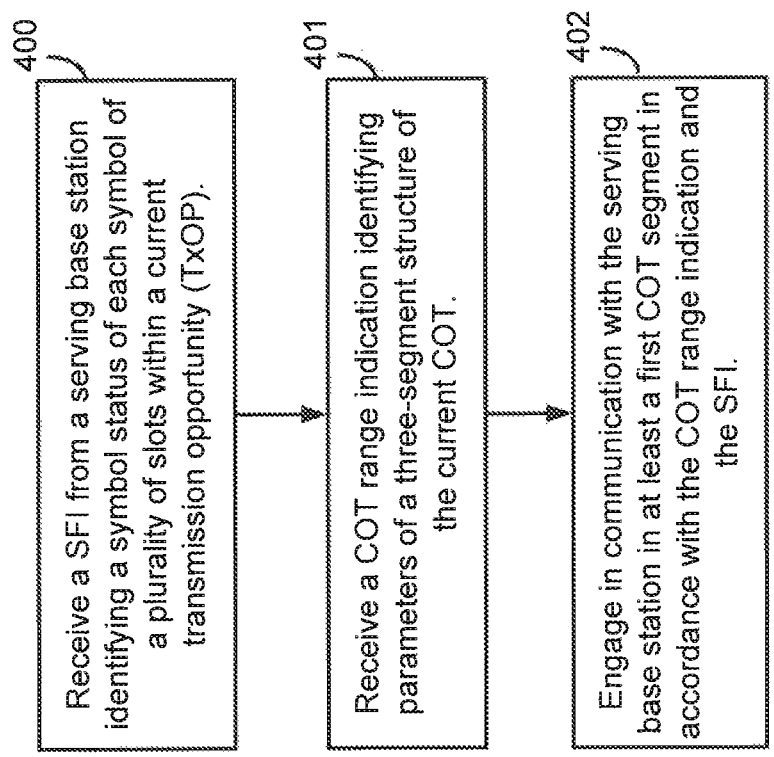
FIG. 4 is a block diagram illustrating example blocks executed to implement one aspect of the present disclosure.
Figure 10:
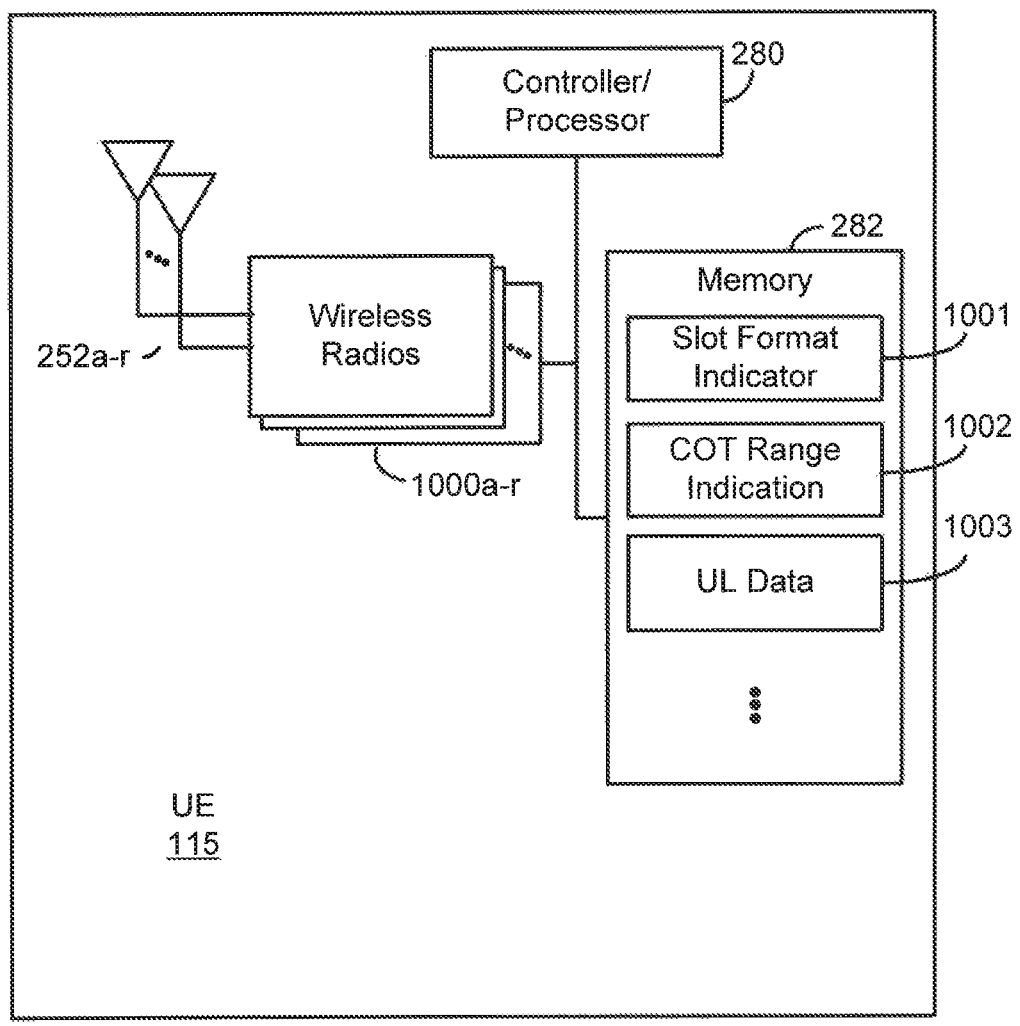
FIG. 10 is a block diagram illustrating an example UE configured according to aspects of the present disclosure.

FIG. 4 is a block diagram illustrating example blocks executed by a UE to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266.

At block 400, a UE receives an SFI from a serving base station, wherein the SFI identifies a symbol status of each symbol of a plurality of slots within a current TxOP. In the course of engaging in communications over a shared communication spectrum, a serving base station may transmit SFI to identify the symbol status (e.g., downlink, uplink, flexible) for each symbol in all COT of a base station's TxOP. A UE, such as UE 115, receives the SFI from the serving base station via antennas 252a-r and wireless radios 1000a-r. UE 115 will then store this SFI information in memory 282 at SFI 1001.

At block 401, the UE receives a COT range indication for a current COT of one or more COTs of the current TxOP, wherein the COT range indication identifies parameters of a three-segment structure of the current COT including a first COT segment, a second COT segment, and a third COT segment. According to the various aspects of the present disclosure, UE 115 also receives at least one COT range indication from the serving base station that identifies the COT structure of a current COT in the base station's TxOP. UE 115 receives the COT range indication via antennas 252*a-r* and wireless radios 100*a-r*. UE 115 then stores the COT range indication information in memory 282 at COT range indication 1002.

At block 402, the UE engages in communication with the serving base station in at least the first COT segment in accordance with the COT range indication and the SFI. Using the detailed symbol status for each symbol in the slots of the current COT along with the COT structure reflected in the COT range indication, UE 115, under control of controller/processor 280, may engage in communication, whether receiving downlink data from the serving base station via antennas 252*a-r* and wireless radios 1000*a-r*, or transmitting uplink data 1003, in memory 282, via wireless radios 1000*a-r* and antennas 252*a-r*.

Figure 5:
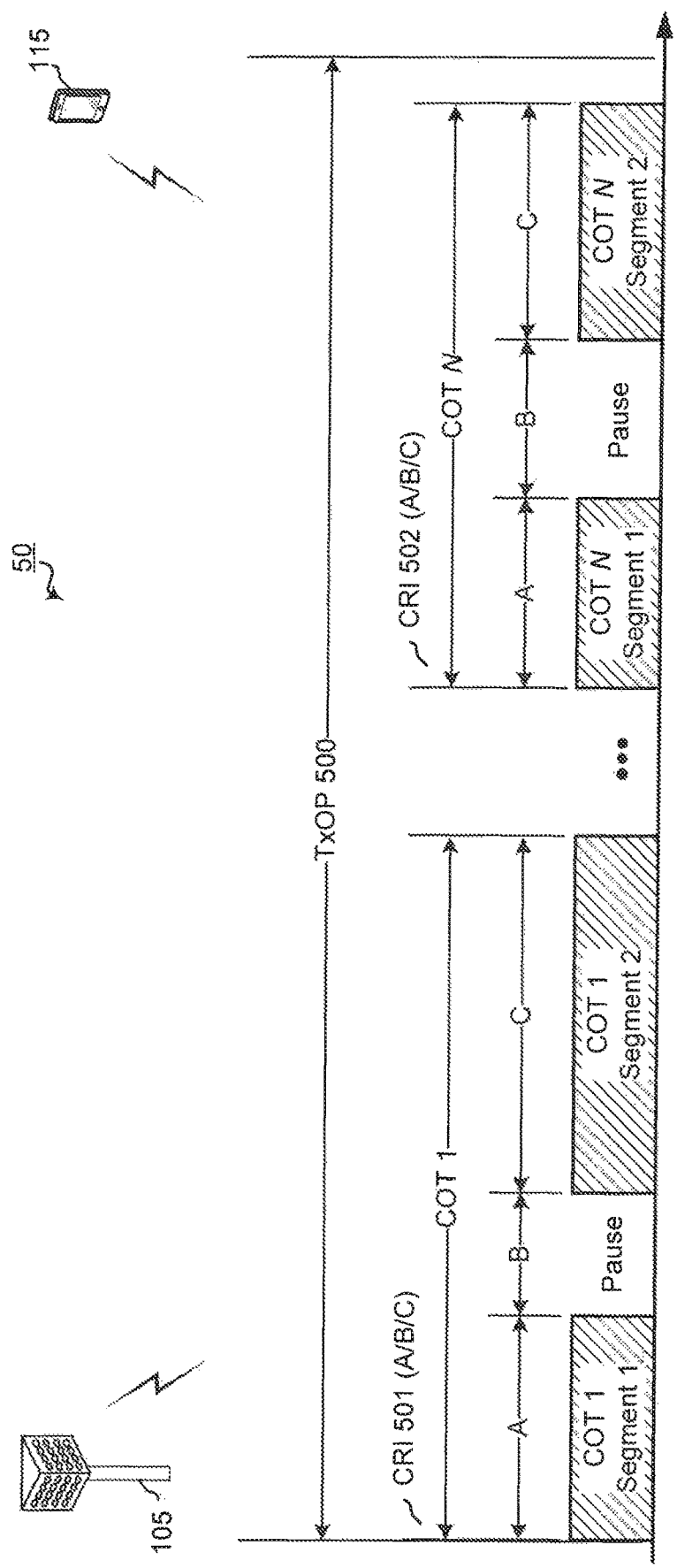
FIG. 5 is a block diagram illustrating an NR-U network having a base station and a UE, each configured according to one aspect of the present disclosure.

FIG. 5 is a block diagram illustrating an example NR-U network 50 having a base station 105 and a UE 115, each configured according to one aspect of the present disclosure. Base station 105 may compete for access to shared communication spectrum using a listen before talk (LBT) procedure. When such LBT attempts are successful for base station 105, it will have access to the shared communication spectrum for the duration of TxOP 500. TxOP 500 may include multiple COT, such as COT 1-COT N, during which communication with base station 105 may be scheduled, such as communications with UE 115.

According to the illustrated aspect, base station 105 transits COT range indication 501 and 502 to UE 115 separately from SFI. COT range indication 501 and 502 provide indication of the three-segment COT structure (Segment 1-A/Pause-B/Segment 2-C) of the illustrated COT, COT 1 and COT N. One of the three segments indicated in COT range indication 501 and 502 may define a pause (e.g., Pause-B for each of COT 1 and COT N). The indication may provide the duration or length of each segment, such as in time or symbol units with the same reference numerology as the SFI configuration. Thus, according to such example implementations, the length of each of Segments 1-3 would be indicated in the COT range indication 501 and 502 (A/B/C). Additional example implementations may provide the ending point of Segment 1, the duration of the pause, the beginning of the next COT segment, and the like. In a special case, any of the three segments may be configured to 0 length.

Various aspects may include option implementations, such as where the indications of each segment (A/B/C) can be jointly encoded, as the maximum COT length may be limited. Additional implementations of the example aspects can provide a maximum length or duration for the pause, as well as a maximum length or duration of the combination of Segments 1 and 2.

Figure 6A:
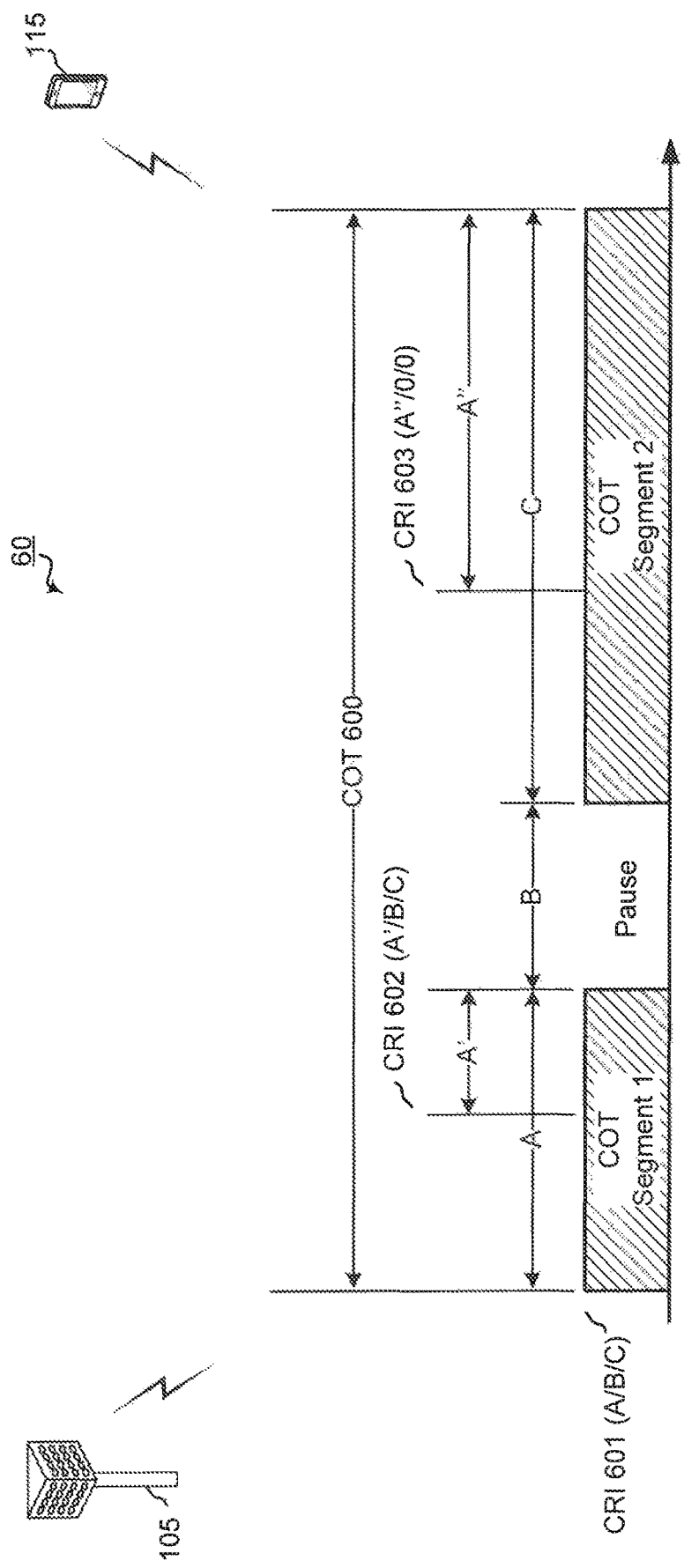
FIGS. 6A-6C are block diagrams illustrating an NR-U network having a base station and a UE, each configured according to one aspect of the present disclosure.

FIG. 6A is a block diagram illustrating an NR-U network 60 having a base station 105 and a UE 115, each configured according to one aspect of the present disclosure. As noted above, after base station 105 has successfully completed an LBT procedure for access to the shared communication spectrum, the resulting TxOP includes one or more COT, such as the illustrated COT 600. Base station 105 transmits COT range indication 601 to identify the COT structure to UE 115 for transmissions within COT 600. COT range indication 601 provides the configurations (A/B/C) for Segment 1, the pause, and Segment 2. According to the illustrated aspect, base station 105 may repeat transmission of COT range indications, such as COT range indications 602 and 603 during the later portion of COT 600. While the subsequent transmissions of COT range indications 602 and 603 include "matching" A/B/C indications, the values, at least for the segments that have not yet been reached, may not be identical. In a first optional aspect, as illustrated in FIG. 6A, the length of each segment or pause is maintained to be the same for COT range indications 601-603, except the part before transmission of the given COT range indication. Effectively the COT range does not change other than the fact that the indication would cover the future portion of COT 600 after transmission of the given COT range indication.

For example, COT range indication 601 provides the three-segment structure identifying durations A/B/C, for Segment 1, the pause, and Segment 2 of COT 600. Thus, at the beginning of COT 600, UE configures the COT structure with a length A for Segment 1, a length B for the pause, and a length C for Segment 2. Base station 105 then transmits COT range indication 602. The three-segment structure identifies a length A' for Segment 1. COT range indication 602 is not intended to configure the COT structure for any part of COT 600 that has already been passed (e.g., the portion between transmission of COT range indication 601 and 602). The COT structure defined by COT range indication 602 includes a shorter length A' of Segment 1, but each of Segment 1, the pause, and Segment 2, are indicated to end at the same time as identified in COT range indication 601.

Base station 105 then transmits COT range indication 603 during the original configuration for Segment 2. However, as the configuration of COT structure in COT range indications according to the aspects illustrated in FIG. 6A including "matching" indications, COT range indication 603 defines a new length A" for the current segment. In order to maintain the COT structure through the end of COT 600, base station 105 defines the lengths of both the B and C segment structures to 0.

Figure 6B:
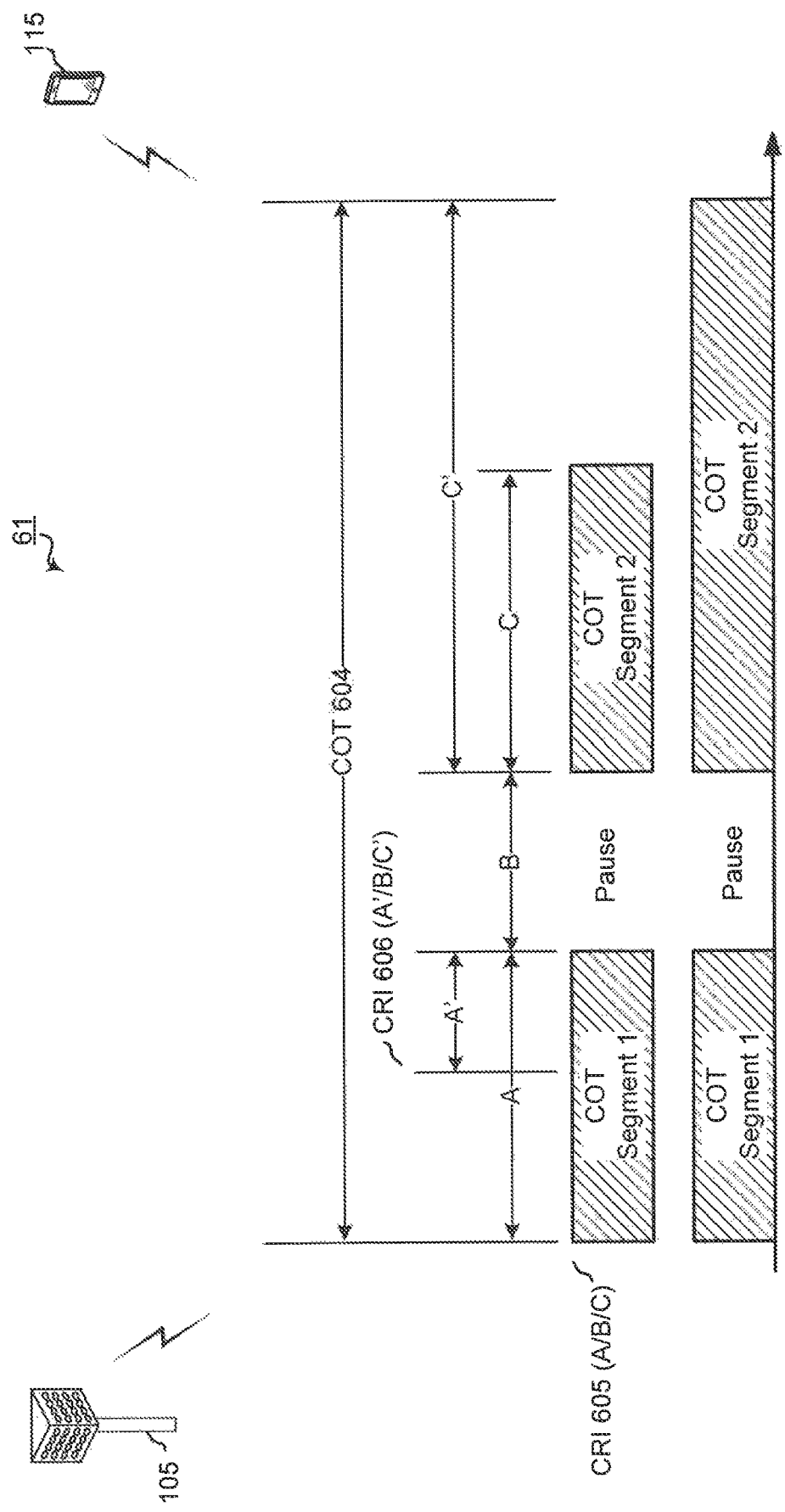

FIG. 6B is a block diagram illustrating an NR-U network 61 having a base station 105 and a UE 115, each configured according to one aspect of the present disclosure. Instead of maintaining matching indications, the aspect illustrated in FIG. 6B maintains the pause at the same length with no change but allows Segment 2 to be modified. The ability of base station 105 to modify the length of Segment 2 allows base station 105 to adjust transmissions more flexibly as traffic changes. For example, as illustrated, base station 105 transmits COT range indication 605 which indicates the three-segment structure with Segment 1 at length A, the pause of length B, and Segment 2 of length C. However, after transmitting COT range indication 605, base station 105 receives more communication traffic for UE 115. Thus, base station 105 responds by transmitting COT range indication 606, which includes a modified length, C', for Segment 2. With the additional traffic for UE 115, base station 105 may desire to increase the transmission time of Segment 2 of the current COT, COT 604. In alternative example scenarios, it may occur that base station 105 desires to reduce the originally configured length of Segment 2. In such alternative scenarios, COT range indication 606 would include the new length, C', for Segment 2 which reduces the segment length from C, set by COT range indication 605. In case gNB changes mind and allow more traffic to be transmitted (say traffic arrives).

Figure 6C:
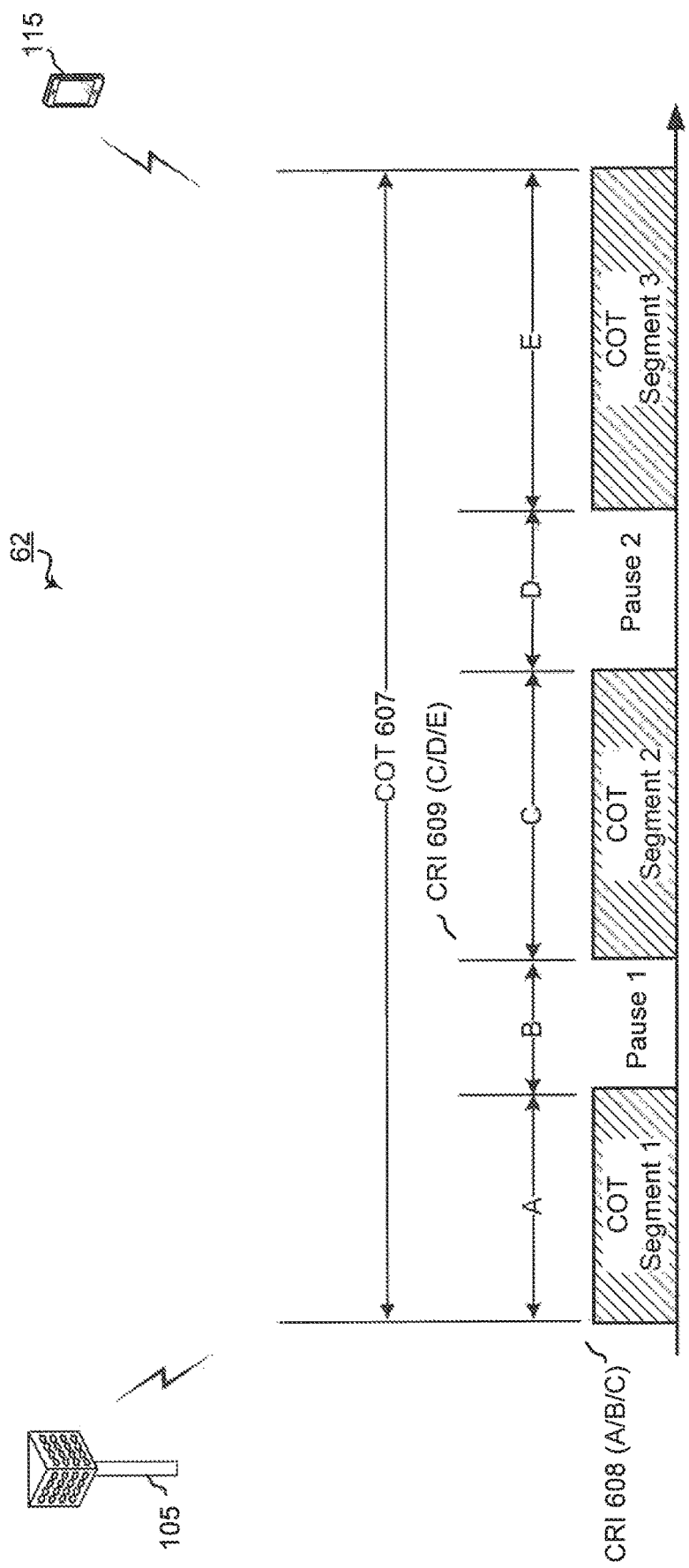

FIG. 6C is a block diagram illustrating an NR-U network 62 having a base station 105 and a UE 115, each configured according to one aspect of the present disclosure. The example aspect illustrated in FIG. 6C provides more control to base station 105 in configuring the structure of COT 607. Each subsequent COT range indication may provide for configuration of an additional three segments beginning with the segment during which the subsequent COT range indication is transmitted. For example, base station 105 initially transmits COT range indication 608 to UE 115 including indications A/B/C for Segment 1, pause 1, and Segment 2 of COT 607. Base station 105 may then transmit COT range indication 609, which includes configuration indications C/D/E for three segments beginning with Segment 2, during which COT range indication 609 was transmitted by base station 105.

As the subsequent range indication, COT range indication 609, includes configuration of three segments, the illustrated aspect may support not only additional COT segmentation of COT 607, but may support additional pauses. Thus, indications C/D/E of COT range indication 609 defines the length C for Segment 2, defines a length D for a second pause, pause 2, and a length E for a Segment 3 of COT 607. Thus, the configuration of reuse the single pause COT range indication format to define multiple pauses by extension.

Figure 7:
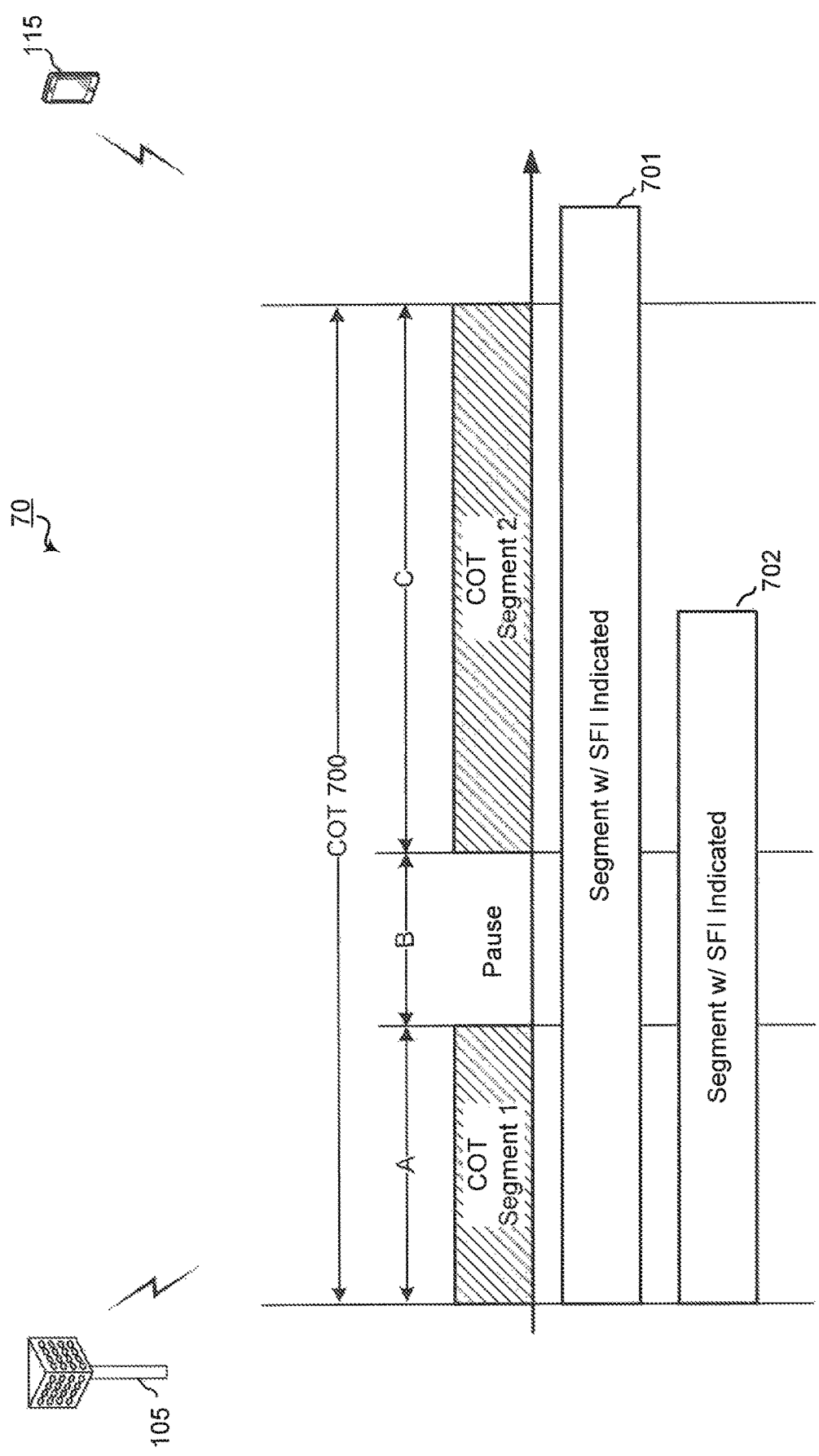
FIG. 7 is a block diagram illustrating an NR-U network having a base station and a UE, each configured according to one aspect of the present disclosure.

FIG. 7 is a block diagram illustrating an NR-U network 70 having a base station 105 and a UE 115, each configured according to one aspect of the present disclosure. The COT range field in general can be configured using radio network temporary identifier (RNTI), search space, length, bit positions, structure, and the like. A special case, under a scheduler decision, may configure the COT range indication in the same downlink control information (DCI) format (e.g., DCI format 2_0) as the SFI but by using a different bit field. Each SFI will include symbol statuses that identify the direction (uplink, downlink, flexible) of the corresponding symbol. As noted above, when in conflict with the RRC configured direction of the symbol, the SFI symbol status will control. However, the symbol status indicated by SFIs are only effective for the symbols in the COT range.

For example, base station 105 may transmit SFI indications 701 or 702 to UE 115. If SFI indication 701 are transmitted, UE 115 will ignore any symbol status for symbols outside of COT 700 that may have an SFI indicated. Alternatively, where base station 105 transmits SFI indication 702, there may not be an SFI indicates for a particular symbol within COT 700. In such a scenario, UE 115 may treat this symbol as a flexible symbol status. Alternatively, UE 115 may treat this symbol, which does not have a corresponding SFI configuration in SFI indication 702, as SFI-configured but not yet detected. Thus, UE 115 would expect the SFI for this symbol to be included in a later SFI transmission. In a third alternative example implementation, UE 115 may treat the symbol according to a 255 slot format received, thus, maintaining all RRC configurations. According to this third example implementation, UE 115 may still be capable of supporting a use case where an SFI has not been indicated for a particular symbol.

Figure 8:
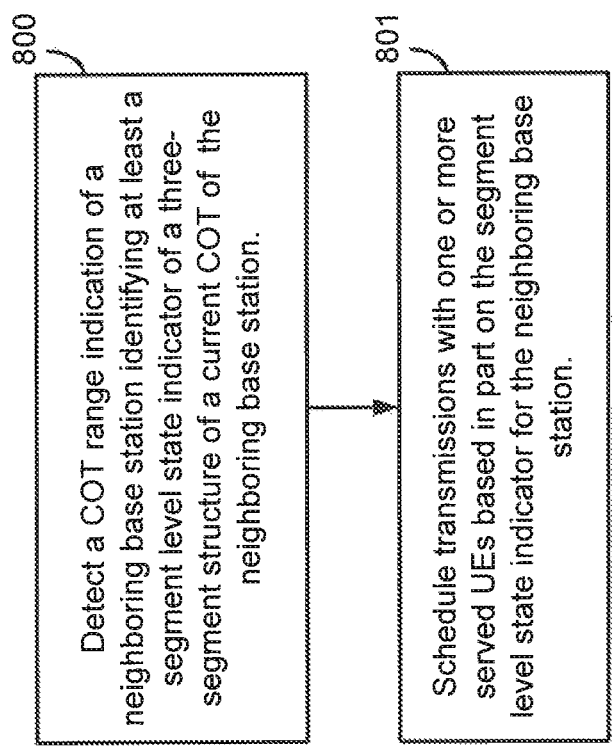
FIG. 8 is a block diagram illustrating example blocks executed to implement one aspect of the present disclosure.
Figure 11:
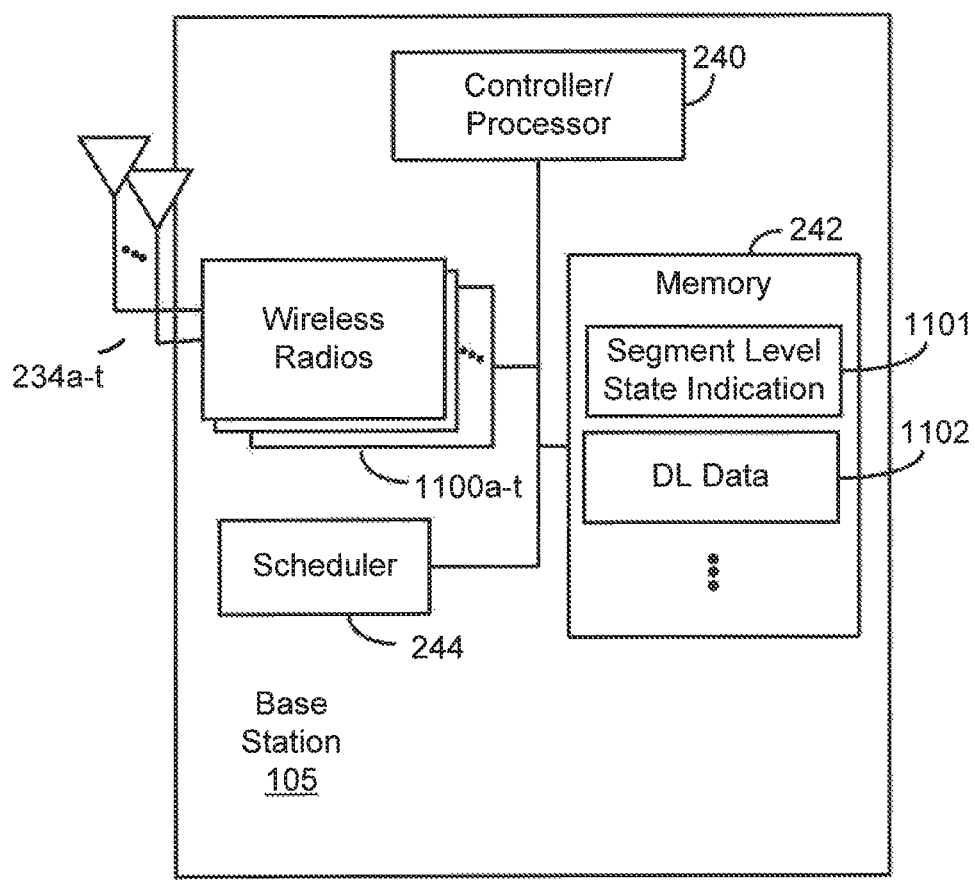
FIG. 11 is a block diagram illustrating an example base station configured according to aspects of the present disclosure.

FIG. 8 is a block diagram illustrating example blocks executed by a base station to implement one aspect of the present disclosure. The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100*a-t* and antennas 234*a-t*. Wireless radios 1100*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 800, a base station detects a COT range indication of a neighboring base station, wherein the COT range indication identifies at least a segment level state indicator of a three-segment structure of a current COT of one or more COTs of the current TxOP of the neighboring base station. Thus, a base station, such as base station 105, detects the COT rand indication signals from the neighboring base stations via antennas 234*a-t* and wireless radios 1100*a-t*. Base station 105 would, under control of controller/processor 240, store the state information in memory 242 at segment level state indication 1101. An SFI will provide detailed symbol state information (e.g., downlink, uplink, flexible) for each symbol in a current COT. For coexistence, a node, base station 105, neighboring the base station involved in the SFI/COT indications according to the various aspects of the present disclosure may not need as detailed of information as provided in the SFI/COT indications.

According to the presently described example aspect, the neighboring base station is the base station involved in the enhanced SFI and COT range indication according to the previously described aspects. This neighboring base station may include a COT segment direction indication within the COT range indication that identifies a segment level state indicator. The segment level state indicator may provide more generalized information. For example, the segment level state indicator may generally indicate downlink only, uplink only, mostly downlink, mostly uplink, mixed status, undetermined status, or the like. Base station 105 within range of this neighboring base station may detect the COT range indication transmitted by the neighboring base station and decode the segment level state indicator via wireless radios 1100*a-t* describing the three-segment structure of the current COT of the neighboring base station. These COT range indication signals are detected via antennas 234*a-t* and wireless radios 1100*a-t*. Part of the COT range indication configuration can be to indicate whether this COT segment direction indication is included or not and how to decode or interpret the indicated states.

At block 801, the base station schedules transmissions with one or more served UEs based in part on the segment level state indicator for the neighboring base station. Base station 105 may use the COT structure information identified in segment level state information 1101, in memory 242, for the neighboring base station to make more intelligent and coordinated scheduling of its own transmissions with its served UEs. Base station 105, under control of controller/processor 280, operates scheduler 244 using the segment level state indication 1101 information on the possible transmissions between the neighboring network nodes. Accordingly, base station 105 coordinates with the transmissions of the neighboring nodes, thereby potentially reducing interference, etc. Where base station 105 has downlink data 1102, it may thereafter schedule the timing for such downlink transmissions.

According to the current standards defined for NR network operations, if a UE fails to detect the configured SFI monitoring, the UE will cancel any RRC-configured uplink transmissions (e.g., sounding reference signals (SRS), scheduling requests (SRs), autonomous uplink (AUL), etc.). However, because a UE would not detect SFI outside of a COT, this NR behavior would not provide comparable functionality in an NR-U network. One exception to this would involve physical random access channel (PRACH) transmissions and SR within PRACH. The current NR rule provides for cell specific PRACH not to be overwritten to other directions by SFI. Therefore, these symbols will be uplink only. Additional aspects of the present disclosure are directed to introducing an NR-U specific behavior that includes a configuration of the LBT type to use with a configured RRC uplink transmission. Granted or scheduled uplink transmissions already have an LBT type control in the corresponding DCI. The described aspects of the present disclosure extend functionality to RRC-configured uplink.

LBT procedures have been categorized based on the channel sensing process performed by the transmitter. In unlicensed network operations, four LBT categories have been defined. A category 1 (Cat 1) LBT is defined as channel access without the transmitter performing any type of channel sensing. A category 2 (Cat 2) LBT provides for a channel sensing process (e.g., energy detection or preamble detection) without additional random back-off. Cat 2 LBT may also be referred to as an abbreviated LBT or 25 μs LBT. A category 3 (Cat 3) LBT provides for a channel sensing process with a random back-off and fixed-size contention window. A category 4 (Cat 4) LBT provides for a channel sensing process with a random back-off and a variable-size contention window. The processing time for each category LBT increases from the Cat 1 LBT, which takes the least amount of time, to the Cat 4 LBT, which takes the longest amount of time. Where a shared channel has some indication of availability, such when a UE prepares uplink transmissions on a shared channel secured by its serving base station (base station TxOP), a shorter LBT process (e.g., Cat 3 or Cat 2 LBT) may be performed with a reliable result. Otherwise, without any indication of availability, a Cat 4 LBT may be performed to provide the most reliable attempt to secure access to the shared medium.

Figure 9:
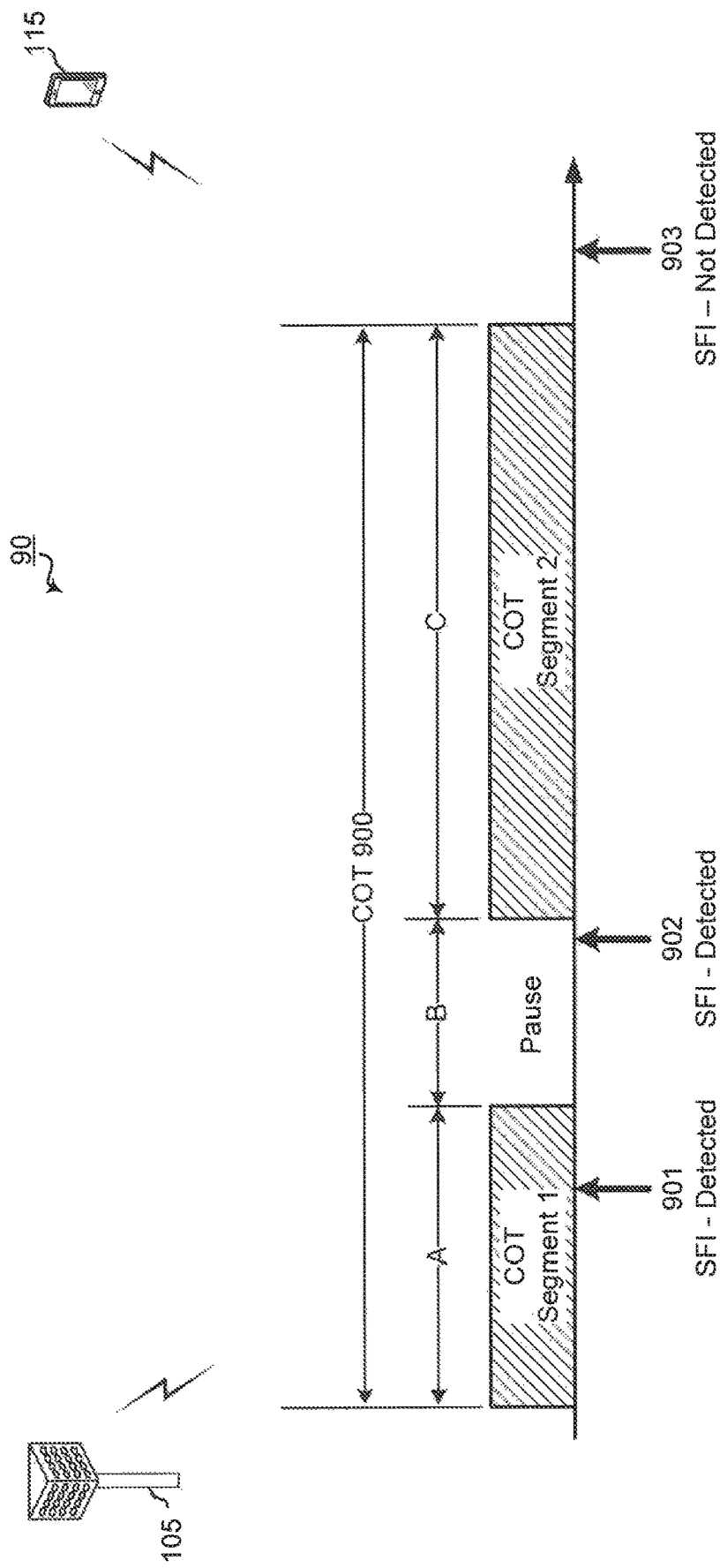
FIG. 9 is a block diagram illustrating an NR-U network having a base station and a UE, each configured according to one aspect of the present disclosure.

FIG. 9 is a block diagram illustrating an NR-U network 90 having a base station 105 and a UE 115, each configured according to one aspect of the present disclosure. Base station 105 has performed an LBT procedure (e.g., Cat 4 LBT, ECCA, etc.) to secure access to shared spectrum. Within the TxOP secured by base station 105, multiple COTs may be configured for transmissions. However, there may be areas within the TxOP duration and COT structure that are considered outside of the TxOP and, thus, may more reliably suggest a transmitter to perform a more extensive LBT (e.g., Cat 4 LBT) rather than a shortened LBT (e.g., Cat 2 LBT). For NR-U operations according to the described aspect of the present disclosure, any RRC configured uplink transmissions will include the configuration of the type of LBT to perform with that transmission. Thus, the RRC uplink configuration would, for example, identify whether the transmission will perform a Cat 4 LBT or a Cat 2 LBT. According to the described aspect, any RRC configured uplink transmissions that are configured for Cat 4 LBT may not be conditioned on detection of SFI, while any RRC configured uplink transmissions configured for Cat 2 LBT will be so conditioned.

As illustrated in FIG. 9, UE 115 is configured for RRC uplink transmissions at 901-903. In a first example implementation, when these uplink transmissions are configured for Cat 2 LBT, the RRC configured uplink transmission are conditioned upon the detection of SFI. Detection of SFI implies that the symbol is within COT 900. Within COT 900, there is an indication that the shared communication channel is available to nodes communicating with base station 105. Thus, a Cat 2 LBT may be reliably used for UE 115 to secure access for RRC configured uplink. For example, at 901, where UE 115 detects the SFI, UE 115 may attempt the RRC configured uplink transmission after performing a Cat 2 LBT. At 902, while UE 115 detects the SFI, the symbol resides within the configured pause of COT 900. Because the pause is considered outside of the TxOP, UE 115 will cancel the RRC uplink transmission at 901. Similarly, at 903, UE 115 fails to detect the SFI, which implies to UE 115 that the corresponding symbol is outside of COT 900 and the TxOP of base station 105. Accordingly, UE 115 would cancel the RRC uplink transmission at 903.

In a second example implementation, when these RRC configured uplink transmissions are configured for Cat 4 LBT, the transmissions may not be conditioned on detection of the SFI. Where the symbol resides outside of COT 900 (e.g., 902 and 903), UE 115 attempts the transmissions after performing the Cat 4 LBT. At 901, there may be a conflict between the RRC configured Cat 4 LBT and the SFI, which would call for a Cat 2 LBT. In such a scenario, UE 115 may simply cancel the transmission because of the conflict, or may be configured to fallback to Cat 2 LBT inside of COT 900.

In a third example implementation, an additional broadcast control may be provided by base station 105 to indicate whether RRC configured uplink transmissions configured for Cat 4 LBT will be allowed within COT 900. If allowed, UE 115 may be configured to relax the LBT process to a Cat 2 LBT within COT 900.

In a fourth example implementation, base station 105 may configured two RRC uplink transmissions, in which one is configured for Cat 4 LBT and the other is configured for Cat 2 LBT. Where UE 115 detects the symbol within COT 900, it will attempt the Cat 2 LBT prior to transmission, otherwise, UE 115 will attempt the Cat 4 LBT prior to transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), a slot format indicator (SFI) from a serving base station, wherein the SFI identifies a symbol status of each symbol of a plurality of slots within a current transmission opportunity (TxOP);
   receiving, at the UE, a channel occupancy time (COT) range indication for a current COT of one or more COTs of the current TxOP, wherein the COT range indication identifies parameters of a three-segment structure of the current COT including a first COT segment, a second COT segment, and a third COT segment; and
   engaging, by the UE, in communication with the serving base station in at least the first COT segment in accordance with the COT range indication and the SFI.

2. The method of claim 1, wherein the second COT segment defines a pause in all transmissions by the serving base station and the UE within the current TxOP.

3. The method of claim 2, wherein the parameters include:
   an ending location of the first COT segment;
   a pause duration of the pause; and
   a second duration of the third COT segment, wherein the ending location, the pause duration, and the second duration are identified in units of symbols.

4. The method of claim 2, further including:
   receiving, at the UE, within the current COT a next COT range indication, wherein the next COT range indication includes updated parameters for the three-segment structure.

5. The method of claim 4,
   wherein the updated parameters associated with the second COT segment and the third COT segment remain unchanged from the parameters of the COT range indication, and
   wherein the updated parameters associated with the first COT segment identify a same ending location of parameters of the first COT segment.

6. The method of claim 4, wherein the updated parameters associated with the third COT segment are modified to change a duration of the third COT segment.

7. The method of claim 4, wherein the updated parameters define a new three-segment structure from a transmission time of the next COT range indication to an end of the current COT, wherein the new three-segment structure includes one or more of: one or more additional COT segments and an additional pause in all transmissions of the UE and the serving base station within the current TxOP.

8. The method of claim 1, further including:
identifying, by the UE, the symbol status for a symbol within the plurality of slots;
ignoring, by the UE, the symbol status in response to the symbol falling outside of the current COT, wherein the engaging in the communication is in accordance with the symbol status for the symbol in response to the symbol falling within the current COT.

9. The method of claim 1, further including:
identifying, by the UE, a symbol within the current COT without the symbol status identified in the SFI; and
treating, by the UE, the symbol as one of:
 a flexible symbol;
 a to-be-configured symbol in a future SFI; or
 a status in accordance with a semi-static symbol status previously identified in radio resource control (RRC) signaling.

10. The method of claim 1, wherein the COT range indication further identifies a segment level state indicator, wherein the segment level state indicator identifies the three-segment structure of the current COT as one of:
 downlink only;
 uplink only;
 mostly downlink;
 mostly uplink;
 mixed direction; or
 undetermined direction.

11. The method of claim 2, further including:
receiving, by the UE, a radio resource control (RRC) uplink transmission configuration, wherein the RRC uplink transmission configuration include configuration of a listen before talk (LBT) type for use with an associated RRC uplink transmission, wherein the LBT type includes one of: a full LBT procedure, or a reduced LBT procedure.

12. The method of claim 11, further including:
failing, by the UE, to successfully decode the SFI associated with a symbol allocated for an RRC uplink transmission;
attempting, by the UE, the RRC uplink transmission when configured with the full LBT procedure; and
canceling, by the UE, the RRC uplink transmission when configured with the reduced LBT procedure.

13. The method of claim 11, further including:
successfully decoding, by the UE, the SFI associated with a symbol within the current COT allocated for an RRC uplink transmission configured for the full LBT procedure;
attempting, by the UE, the RRC uplink transmission after the full LBT procedure in response to the symbol located within the pause in the current COT;
performing, in response to the symbol located outside of the pause in the current COT, one of:
 canceling the RRC uplink transmission; or
 canceling the RRC uplink transmission in response to a conflict in the symbol status identified by the SFI and the RRC uplink transmission configuration; or
 attempting, by the UE, the RRC uplink transmission in accordance with an LBT procedure associated with the symbol status identified in the SFI.

14. A method of wireless communication, comprising:
detecting, by a base station, a channel occupancy time (COT) range indication of a neighboring base station, wherein the COT range indication identifies at least a segment level state indicator of a three-segment structure of a current COT of one or more COTs of the current TxOP of the neighboring base station; and
scheduling, by the base station, transmissions with one or more served user equipments (UEs) based in part on the segment level state indicator for the neighboring base station.

15. The method of claim 14, wherein the segment level state indicator identifies the three-segment structure of the current COT of the neighboring base station as one of:
 downlink only;
 uplink only;
 mostly downlink;
 mostly uplink;
 mixed direction; or
 undetermined direction.

16. An apparatus configured for wireless communication, the apparatus comprising:
at least one processor; and
a memory coupled to the at least one processor,
wherein the at least one processor is configured:
 to receive, at a user equipment (UE), a slot format indicator (SFI) from a serving base station, wherein the SFI identifies a symbol status of each symbol of a plurality of slots within a current transmission opportunity (TxOP);
 to receive, at the UE, a channel occupancy time (COT) range indication for a current COT of one or more COTs of the current TxOP, wherein the COT range indication identifies parameters of a three-segment structure of the current COT including a first COT segment, a second COT segment, and a third COT segment; and
 to engage, by the UE, in communication with the serving base station in at least the first COT segment in accordance with the COT range indication and the SFI.

17. The apparatus of claim 16, wherein the second COT segment defines a pause in all transmissions by the serving base station and the UE within the current TxOP.

18. The apparatus of claim 17, wherein the parameters include:
an ending location of the first COT segment;
a pause duration of the pause; and
a second duration of the third COT segment, wherein the ending location, the pause duration, and the second duration are identified in units of symbols.

19. The apparatus of claim 17, further including configuration of the at least one processor to receive, at the UE, within the current COT a next COT range indication, wherein the next COT range indication includes updated parameters for the three-segment structure.

20. The apparatus of claim 19,
wherein the updated parameters associated with the second COT segment and the third COT segment remain unchanged from the parameters of the COT range indication, and
wherein the updated parameters associated with the first COT segment identify a same ending location of parameters of the first COT segment.

21. The apparatus of claim 19, wherein the updated parameters associated with the third COT segment are modified to change a duration of the third COT segment.

22. The apparatus of claim 19, wherein the updated parameters define a new three-segment structure from a transmission time of the next COT range indication to an end of the current COT, wherein the new three-segment structure includes one or more of: one or more additional COT segments and an additional pause in all transmissions of the UE and the serving base station within the current TxOP.

23. The apparatus of claim 16, further including configuration of the at least one processor:
to identify, by the UE, the symbol status for a symbol within the plurality of slots;
to ignore, by the UE, the symbol status in response to the symbol falling outside of the current COT, wherein the configuration of the at least one processor to engage in the communication is executed in accordance with the symbol status for the symbol in response to the symbol falling within the current COT.

24. The apparatus of claim 16, further including configuration of the at least one processor:
to identify, by the UE, a symbol within the current COT without the symbol status identified in the SFI; and
to treat, by the UE, the symbol as one of:
a flexible symbol;
a to-be-configured symbol in a future SFI; or
a status in accordance with a semi-static symbol status previously identified in radio resource control (RRC) signaling.

25. The apparatus of claim 16, wherein the COT range indication further identifies a segment level state indicator, wherein the segment level state indicator identifies the three-segment structure of the current COT as one of:
downlink only;
uplink only;
mostly downlink;
mostly uplink;
mixed direction; or
undetermined direction.

26. The apparatus of claim 17, further including configuration of the at least one processor to receive, by the UE, a radio resource control (RRC) uplink transmission configuration, wherein the RRC uplink transmission configuration include configuration of a listen before talk (LBT) type for use with an associated RRC uplink transmission, wherein the LBT type includes one of: a full LBT procedure, or a reduced LBT procedure.

27. The apparatus of claim 26, further including configuration of the at least one processor:
to fail, by the UE, to successfully decode the SFI associated with a symbol allocated for an RRC uplink transmission;
to attempt, by the UE, the RRC uplink transmission when configured with the full LBT procedure; and
to cancel, by the UE, the RRC uplink transmission when configured with the reduced LBT procedure.

28. The apparatus of claim 26, further including configuration of the at least one processor:
to successfully decode, by the UE, the SFI associated with a symbol within the current COT allocated for an RRC uplink transmission configured for the full LBT procedure;
to attempt, by the UE, the RRC uplink transmission after the full LBT procedure in response to the symbol located within the pause in the current COT;
to execute, in response to the symbol located outside of the pause in the current COT, configuration of the at least one processor to one of:
cancel the RRC uplink transmission; or
cancel the RRC uplink transmission in response to a conflict in the symbol status identified by the SFI and the RRC uplink transmission configuration; or
attempt, by the UE, the RRC uplink transmission in accordance with an LBT procedure associated with the symbol status identified in the SFI.

29. An apparatus configured for wireless communication, the apparatus comprising:
at least one processor; and
a memory coupled to the at least one processor,
wherein the at least one processor is configured:
to detect, by a base station, a channel occupancy time (COT) range indication of a neighboring base station, wherein the COT range indication identifies at least a segment level state indicator of a three-segment structure of a current COT of one or more COTs of the current TxOP of the neighboring base station; and
to schedule, by the base station, transmissions with one or more served user equipments (UEs) based in part on the segment level state indicator for the neighboring base station.

30. The apparatus of claim 29, wherein the segment level state indicator identifies the three-segment structure of the current COT of the neighboring base station as one of:
downlink only;
uplink only;
mostly downlink;
mostly uplink;
mixed direction; or
undetermined direction.

* * * * *